No. 654,766. Patented July 31, 1900.
G. SELLE.
PRODUCTION OF COLORED PHOTOGRAPHS.
(Application filed Dec. 7, 1898.)
(No Model.)
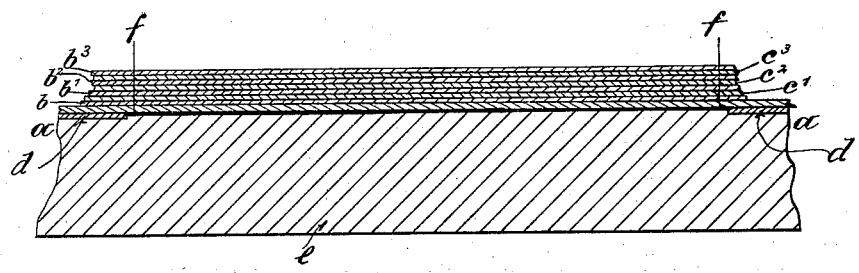
Witnesses:
Inventor:
Gustav Selle

UNITED STATES PATENT OFFICE.

GUSTAV SELLE, OF BRANDENBURG-ON-THE-HAVEL, GERMANY.

PRODUCTION OF COLORED PHOTOGRAPHS.

SPECIFICATION forming part of Letters Patent No. 654,766, dated July 31, 1900.

Application filed December 7, 1898. Serial No. 698,579. (No specimens.)

*To all whom it may concern:*

Be it known that I, GUSTAV SELLE, a subject of the German Emperor, and a resident of Brandenburg-on-the-Havel, in the Empire of Germany, have invented certain new and useful Improvements in the Production of Colored Photographs, of which the following is a specification.

The methods hitherto used for obtaining three-colored photographs directly on paper are, apart from ordinary mechanical printing, of which there is no question here, the three-colored collotype-printing and the india-rubber printing. The three-colored collotype print is very suitable for large editions, but too expensive for small editions, while with india-rubber printing all the fineness of the photograph is lost by the over painting, and it cannot properly be called a "photographic" process. With the known chrome-gelatine-mordant process upon collodion skins it hitherto has only been possible to obtain a positive mounted on paper by first making the different monocolored chrome-gelatine, mordant pictures as transparencies on collodion skins and then placing them one upon the other and by afterward pasting these on paper. This method is not suitable for paper photographs, and by the present process the production of such photographs is obtained directly on paper.

The accompanying drawing illustrates the invention by means of a section through the finished print, the thicknesses being greatly exaggerated.

The paper $a$ is impregnated with a waterproof layer $b$—as, for instance, collodion. On this is poured a light sensitive layer $c'$—for instance, a chrome-gelatine solution—suitable by the change effected in it by exposure to light under the negative to receive on the same spots color from a color-bath. When this sensitized layer is dry, one of the three negatives (produced in the known manner by three consecutive exposures behind three light-filters in the ground colors) is laid upon the sensitive layer. After exposure to light the negative is removed and the picture is washed with cold water and developed by immersing in a color-bath complementary to the respective light-filter. This photograph is then again covered with a waterproof layer $b'$ and this after drying again covered with a sensitive layer $c^2$, exposed under the second negative, and thereupon the second photograph is in a similar manner developed upon the picture lying under it in a second color-bath complementary to the light-filter of the respective negative. After again covering this two-colored photograph with a waterproof layer $b^2$ and pouring on a third sensitive layer $c^3$ and drying, it is exposed for a third time beneath the third negative, and the third positive image is developed similarly upon the two underlying positives. The three-colored picture is thus obtained and should be covered by a collodion layer $b^3$.

It is necessary that the paper shall present during the aforesaid operations a level and tightly-stretched surface which shall remain unaltered and beyond direct influence of the color-baths. To this end the paper, provided with an adhesive border $d$, is first stretched on a rigid plane—for instance, on a sheet of glass $e$. The latter acts as a protection for the back of the paper, the surface being protected by the waterproof layer $b$ aforesaid. When the print has undergone all the aforesaid operations and is finished, it is cut all around within the adhesive borders $d$—for example, on the lines $ff$—when the print will come off clear of the glass $e$ and can be mounted like any ordinary print.

In order to produce the three pictures exactly one upon the other where perhaps thick opaque paper is used, it is desirable in a similar manner, as is done in multicolor-printing, to make corresponding register-marks on the negative, which become subsequently duplicated on the positive, so that there is no difficulty in obtaining a true register.

I claim as my invention—

1. The process of production of multicolored-paper photographs consisting in covering the paper with a waterproof layer, then with a sensitive layer exposing and developing the latter for one color, again covering same with a waterproof layer then with a sensitive layer, exposing and developing the latter for another color and repeating the operations of waterproofing sensitizing exposure and development for each additional color.

2. The process of production of multicolored-paper photographs consisting in covering the paper with a layer of collodion, then with a sensivive layer, exposing and developing the latter for one color again covering same with collodion then with a sensitive layer exposing and developing the latter for another color, and repeating the operation of covering with collodion layer, with sensitive layer, exposure and development for each additional color.

3. The process of production of multicolored-paper photographs consisting in stretching the paper securely on an impervious plane surface covering the paper with a waterproof layer, then with a sensitive layer exposing and developing the latter for one color, again covering same with a waterproof layer, then with a sensitive layer, exposing and developing the latter for another color and repeating the operations of waterproofing, sensitizing exposure and development for each additional color and afterward removing the paper from the plane surface.

4. The process of production of multicolored-paper photographs consisting in stretching the paper securely on an impervious plane surface covering the paper with a layer of collodion, then with a sensitive layer, exposing and developing the latter for one color again covering same with collodion then with a sensitive layer exposing and developing the latter for another color and repeating the operations of covering with collodion layer, with sensitive layer, exposure and development for each additional color and afterward removing the paper from the plane surface.

In witness whereof I have signed this specification in the presence of two witnesses.

GUSTAV SELLE.

Witnesses:
HENRY HASPER,
E. L. GOLDSCHMIDT.